(12) United States Patent
Sarrasín Gómez et al.

(10) Patent No.: US 12,742,439 B2
(45) Date of Patent: Sep. 22, 2026

(54) METHOD FOR MANUFACTURING AND ASSEMBLING A PLURALITY OF TOWERS ON A WIND FARM

(71) Applicant: ESTEYCO S. A., Madrid (ES)

(72) Inventors: David Sarrasín Gómez, Madrid (ES); José Salustiano Serna García-Conde, Madrid (ES)

(73) Assignee: ESTEYCO S. A., Madrid (ES)

( * ) Notice: Subject to any disclaimer, the term of this patent is extended or adjusted under 35 U.S.C. 154(b) by 242 days.

(21) Appl. No.: 18/713,657

(22) PCT Filed: Nov. 28, 2022

(86) PCT No.: PCT/ES2022/070764
§ 371 (c)(1),
(2) Date: May 26, 2024

(87) PCT Pub. No.: WO2023/099803
PCT Pub. Date: Jun. 8, 2023

(65) Prior Publication Data

US 2025/0043771 A1 Feb. 6, 2025

(30) Foreign Application Priority Data

Dec. 1, 2021 (ES) .................................. 202131119

(51) Int. Cl.
*E04H 12/00* (2006.01)
*E04H 12/12* (2006.01)
(Continued)

(52) U.S. Cl.
CPC .......... *F03D 13/112* (2023.08); *E04H 12/12* (2013.01); *E04H 12/342* (2013.01); *F03D 13/402* (2023.08)

(58) Field of Classification Search
CPC ....... F03D 13/112; F03D 13/40; E04H 12/12; E04H 12/342
See application file for complete search history.

(56) References Cited

U.S. PATENT DOCUMENTS

2010/0162652 A1* 7/2010 Croes .................... F03D 13/20 52/651.01
2010/0325986 A1* 12/2010 Maestre ................ E04H 12/12 52/223.13

(Continued)

FOREIGN PATENT DOCUMENTS

EP 1558464 A1 8/2005

OTHER PUBLICATIONS

International Search Report and Written Opinion in related PCT application PCT/ES2022/070764, dated May 22, 2023.

(Continued)

*Primary Examiner* — Basil S Katcheves
(74) *Attorney, Agent, or Firm* — Nathan & Associates Patent Agents Ltd.; Menachem Nathan

(57) ABSTRACT

The present invention relates to a method for manufacturing and assembling a plurality of towers (1) on a wind farm (2), wherein said towers (1) comprise a plurality of precast concrete segments (3) superimposed in height, wherein the method comprises: a) establishing a centralised manufacturing point (6) on the wind farm (2); and b) establishing a plurality of land routes (8) to the definitive location (5) of the towers (1). Advantageously, the method further comprises: c) prefabricating at least one segment (3) of a tower (1); d) positioning the prefabricated segment (2) in a vertical position on a land transport system (9); e) transporting the segment (3) in a vertical position to the definitive location (5) of one of the towers (1), following one of the land routes
(Continued)

(8); and f) assembling the segment (3), forming at least one portion of a shaft (4) of a tower (1).

12 Claims, 1 Drawing Sheet

(51) Int. Cl.

| | |
|---|---|
| ***E04H 12/34*** | (2006.01) |
| ***F03D 13/10*** | (2016.01) |
| ***F03D 13/40*** | (2016.01) |

(56) References Cited

U.S. PATENT DOCUMENTS

| | | | | |
|---|---|---|---|---|
| 2017/0089090 | A1* | 3/2017 | Díez Cornejo | F03D 13/20 |
| 2018/0282134 | A1* | 10/2018 | Lagerweij | B66C 23/82 |
| 2022/0177281 | A1* | 6/2022 | Helmens | B66C 23/82 |
| 2024/0157644 | A1* | 5/2024 | Tobin | B29C 64/321 |
| 2024/0209651 | A1* | 6/2024 | Lebon | B28B 5/04 |

OTHER PUBLICATIONS

Mammoet Wind. “Record-breaking transport of turbine tower section”, Company Onshore Wind News, Jun. 2, 2016, <URL: https://www.mammoet.com/news/record-breaking-transport-of-turbine-tower-section> (accessed on Mar. 2, 2023).

Heavy Lift News. Mega Windmill Transporter Patents for Nooteboom. Sponsored News, Feb. 4, 2019 <URL: https://www.heavyliftnews.com/mega-windmill-transporter-patented-by-nooteboom/> (accessed on Feb. 10, 2022).

Rino Trailers Part of Noteboom Trading. Cama con plataforma de dirección automática Doll M175. Dec. 31, 1990 <URL: https://www.nooteboomtrading.com/es/trailers/113011 > (accessed on Feb. 15, 2022).

* cited by examiner 1
2
3
4
5
6
7
8
9
10

METHOD FOR MANUFACTURING AND ASSEMBLING A PLURALITY OF TOWERS ON A WIND FARM

FIELD OF THE INVENTION

The present invention relates to a method for installing and assembling towers and, preferably, of wind turbine towers. More specifically, the invention relates to a method for manufacturing, transporting and assembling hollow towers, preferably formed by precast concrete segments, which is particularly suitable for simplifying the operations for installing tower unit assemblies, for example on a wind farm. The invention also relates to one or more concrete towers manufactured and assembled with the mentioned method.

BACKGROUND OF THE INVENTION

In recent decades, the nominal power of wind turbines has gradually increased due to the increase in rotor diameter. Consequently, this has made it necessary to use higher and more robust towers to support them. For example, between 1990 and 2020, the maximum power of onshore wind turbines has increased threefold, currently exceeding 6 MW and doubling their height and maximum rotating diameter of their rotors since the beginning of this period.

This increase in stress on the tower supporting the wind turbine, derived from the increase in rotor size, means that towers manufactured using traditional techniques, mainly using welded steel elements, are increasingly giving way to other more suitable tower concepts. In this respect, there has been an increasing use of concrete towers in recent years, which is particularly advantageous for high tower heights, typically greater than 100 m. Concrete is cheaper, more durable and also heavier than steel. It also allows tower geometries with a larger cross-section diameter, which is necessary to withstand the loads of larger wind turbines.

Concrete towers can essentially be divided into two main types:

A) Towers Made Up of Precast Concrete Elements, Transported to their Definitive Location:

These are characterised by the fact that they are mostly made up of prefabricated segments, which are transported from a factory to an assembly platform wherein the tower installation process is carried out at its working location. An example of the manufacturing and installation techniques for this type of tower is described in patent ES 2371960 B1. Under these techniques, the factory of the prefabricated elements that make up the tower can be arranged at a greater or lesser distance from the definitive location of each wind turbine. As the concrete towers are heavy, the prefabricated element factories are sometimes installed in the same area wherein the wind farm is located, in order to minimise the corresponding transport costs. The size and geometry of the prefabricated elements are also conditioned by transport constraints, with the following three types being used for the most part:

Reduced height rings or sections: these are annular segments whose height is lower than their diameter or width and which mainly take the form of a ring, as described in patent ES 2659523 T3. Due to manufacturing and logistical constraints, they are less than 4.0 m in height and the rings at the lower portion of the tower are usually also divided into two C-shaped parts, because the diameter of the tower at the bottom (more than 6.0 m) means that a whole section cannot travel, due to its excessive width. In this way, a tower of, for example, 100 m may have about thirty rings, about half of which have been manufactured and transported in addition in two C-shaped portions and attached to one another to form a ring at the definitive assembly location. The smaller diameter rings in the upper portion can also each be manufactured and transported as a single part.

High-height sections: these are segments whose height is significantly greater than their diameter or width, which are manufactured and transported horizontally. This is the most common case in steel towers, and may occur in some upper section of a concrete tower, although it is not the most common. They are characterised in that the tower segments are manufactured, transported and stored in a horizontal position, and during the assembly process, once at the definitive location, an assembly crane places them upright and then places them in their final position on the tower. These are sections that normally do not exceed 4.5 m in diameter, in order to be transported from the factory to the definitive location of the tower, complying with the typical transport clearances and the stability of the vehicles that transport them.

Panels or voussoirs: this type of segments is common in precast concrete towers. The elements making them up are elongated and can be flat or curved. They are elements that are manufactured, stored and transported horizontally. On arrival at the tower's definitive location, they are placed upright and attached to one another to form a tower section by means of vertical joints between said parts. This operation is referred to as pre-assembly of sections. The section thus formed is then hoisted to its definitive position on the tower. An example of this type of tower is the one described in ES 2326010 B2. On other occasions, the panels are placed upright and placed directly in their final position, without the aforementioned pre-assembly process, as described in ES 2704624 T3.

The main advantages of prefabricated towers are efficient manufacturing and high assembly speed, and the drawbacks are high transport costs and assembly costs. The weight and size of concrete towers makes it necessary to divide them into a considerable number of elements, which makes the manufacture, transport and assembly significantly more expensive.

B) Towers with Elements Manufactured at their Definitive Location:

As concrete is an easily transportable material, towers have also been designed and built to be manufactured at their definitive locations. In this way, it is not the elements of the tower that are transported, but rather the means of manufacture and the materials used (mainly concrete and reinforcing steel). Within this category, there are two main types of towers:

In-situ towers: these are towers manufactured by climbing or sliding in the position of the wind turbine itself, such as the tower described in ES 2614861 T3.

Towers manufactured at their definitive location: these are towers whose elements are manufactured on an assembly platform close to the position of the tower, to then be placed with a crane in the position of the wind turbine, such as the tower described in patent EP 3212863 B1. Compared to towers manufactured entirely in-situ, towers manufactured on site have the advantage that they are not manufactured at a height, but at ground level, so that several tower sections can be manufactured simultaneously, but they have the drawback that they require a final assembly phase of the tower. Compared to towers made of prefabricated elements and transported to the location, they have the advantage of saving on transport and reducing the number of elements, thus facilitating the assembly of a single tower. However, for the construction of wind farms, they require taking manufacturing tools to the location of each tower on the farm, which is not efficient in terms of time and causes the loss of the efficiency advantages of a more industrial manufacturing process.

Compared to concrete towers made of prefabricated and transported elements, the tower variants manufactured on site save the entire transport and part or all of the assembly of the segments of the towers. In addition, their structure is simpler, because the towers usually comprise fewer segments to be attached to one another. However, their manufacture is slower and more complex, including the dismantling, removal and installation of complex tooling in each unit, as well as generally requiring manufacturing work at a height and a higher cost of concrete to be transported to the definitive location of each tower.

Finally, it should be noted that there are also numerous combined or hybrid towers, in which both types are mixed in the same tower. Towers in which the lower portion is made of concrete and the upper portion is a steel tube are very common, although there are also towers the lower portion of which can be manufactured in-situ, and the upper portion is made of precast concrete. To a greater or lesser extent, hybrid towers solve some of the problems of each type of tower, but on the other hand, they have to coexist with the problems and means of each type of tower used.

Thus, an object of the present invention is to provide a method for manufacturing and assembling concrete towers based on a plurality of pre-assembled segments of a tower (preferably as a succession of segments, or analogous modules), which is more efficient than the alternatives in the prior art. Preferably, the invention is applicable to concrete towers with a frustoconical section, commonly used to withstand the high moments at the base of the tower. However, the object can also be applied to other types of section configurations, such as cylindrical, polygonal, etc. Likewise, although repeated reference is made in the document to wind turbine towers, the present invention can also be used, without limitation, in any other type of tower based on precast concrete elements, or portions thereof.

BRIEF DESCRIPTION OF THE INVENTION

In order to overcome the technical problems described in the above paragraphs, the present invention proposes a novel method for manufacturing and assembling concrete towers, which is essentially based on optimising operations for pre-assembly, transport and assembly of the segments making up the tower, and that improves the times and reduces the total number of operations compared to known solutions.

More specifically, a first object of the present invention relates to a method for manufacturing and assembling a plurality of towers on a wind farm, wherein each of said towers comprises a plurality of precast concrete segments superimposed in height, forming a shaft of a tower, and wherein each tower occupies, after its assembly, a definitive location on the wind farm. The method preferably comprises performing the following steps, in any order:

a) establishing a centralised manufacturing point on the wind farm, wherein said centralised manufacturing point is equipped with means for prefabricating the segments of the towers; and
b) establishing a plurality of land routes from the centralised manufacturing point to the definitive location of the towers.

Advantageously in the invention, the method further comprises performing the following steps:

c) prefabricating vertically at least one segment of a tower, the height of said segment being greater than 5.0 m;
d) positioning the segment prefabricated in step c) in a substantially vertical position on a land transport system;
e) transporting the segment positioned in step d), in a substantially vertical position on the land transport system, from the centralised manufacturing point to the definitive location of one of the towers, following one of the land routes, wherein said land routes are free of vertical clearance, such as those imposed by bridges, tunnels and/or electrical power lines;
f) assembling the segment transported in step e) in the definitive location of one of the towers, forming at least one portion of the shaft of said tower;
g) repeating steps c)-f) for a plurality of towers on the wind farm.

Preferably in the method of the invention, the step e) includes a step of stockpiling in a region comprised between the manufacturing point and the definitive location of the tower, wherein the segment is stored in said stockpiling area in a substantially vertical position until it is taken to the definitive location.

With respect to the towers manufactured in their definitive location, the method object of the present invention coincides in the simplicity of design that is achieved by reducing the number of segments forming the tower (as these have heights greater than 6.0 m). However, it differs from the latter in that said reduction is not achieved based on manufacturing in said definitive location to eliminate restrictions on transport and to be able to make taller and wider tower sections, but by maintaining the manufacture of sections in a factory, with the advantages characteristic of a centralised manufacture: work in a controlled environment and at a low height, direct supply of concrete from an adjacent concrete plant and more robust and industrialised means, given that they do not have to be dismantled and taken to a new location with the construction of each tower.

With respect to precast concrete towers, the method of the invention has the great advantage of significantly reducing the number of segments to be manufactured, transported and assembled to form the tower, while also maintaining the ease of manufacture typical of towers that are manufactured vertically, due to the absence of vertical joints. In this context, there are towers (almost all steel towers, with some concrete tower sections) having segments with heights in excess of 6.0 m (steel tower sections typically range from 8.0 m to 25.0 m). However, these towers are characterised by always comprising methods for manufacturing, storing and transporting the segments horizontally, with steps that are very different from those of the present method.

In a preferred embodiment of the method of the invention, the land transport system comprises a modular trailer type vehicle, a self-propelled modular transporter (SPMT) and/or a self-propelled transporter (SPT). Therefore, the method for manufacturing and assembling object of the invention is able to synergistically combine two main characteristics: the manufacturing in the vicinity of the wind farm or on said farm, in a factory supplying elements for all the towers on said wind farm, together with the use, for the transport and handling of the segments, of a transport system of the modular trailer/SPT/SPMT type, in a novel manner with respect to the uses conventionally performed in the sector of concrete towers. By combining both characteristics, it is possible to define a method based on a reduced number of segments of a very tall tower, the manufacture, stockpiling and transport of which is performed vertically, achieving considerable savings in tower construction times. Likewise, the novel utilisation of the specific characteristics of land routes on wind farms, compared to the conventional road network, and of the capabilities of modular trailers/SPTs/SPMTs to exploit those characteristics, give rise to a new tower design and to a new construction process, which are improved and free of the limitations of the prefabricated tower designs currently being used.

In another preferred embodiment of the method of the invention, the land routes do not cross under any bridge and/or tunnel and, optionally, electrical power lines. This makes the steps of transporting the segments easier to perform. In contrast to the method of the invention, methods based on manufacturing points of the segments far away from the wind farm present greater difficulties when encountering these height limitations, which necessarily impose corresponding levels on the height of the prefabricated segments.

In another preferred embodiment of the method of the invention, step c) and/or the step of stockpiling in a region comprised between the point of manufacture and the definitive location of the tower are performed on raised supports, adapted such that they allow the land transport system to be positioned under said raised supports, and wherein step d) is performed without using crane or overhead crane type lifting means. The steps of pre-manufacture and positioning of the segments prior to their transport are thereby simplified and rendered less expensive. This is achieved as a result of the use of the transport system with the capability of adjusting the height of the loading surface.

In another preferred embodiment of the method of invention, the raised support mentioned in the above embodiment comprises height-adjustable surfaces, adapted such that they allow performing step d) also without needing cranes or other loading and unloading methods, by adjusting said surfaces until positioning the prefabricated segment on said land transport system. Said regulation can be carried out, in different embodiments, by hydraulic, pneumatic or mechanical means, without limitation.

In another preferred embodiment of the method of invention, the weight and height of the segments of the tower are defined such that all the segments can be hoisted to their definitive position by one and the same crane, without requiring changes in the configuration thereof.

In another preferred embodiment of the method of the invention, step f) further comprises a step of stressing the segment assembled in the shaft of the tower. This achieves the tower finally manufactured having greater resistance and robustness against stressing and loads to which it is subjected.

In another preferred embodiment of the method of the invention, step f) further comprises making horizontal joints in one or more segments assembled in the shaft of the tower. Said joints allow providing the shaft of the tower with structural resistance and integrity in a simple and scalable manner.

In another preferred embodiment of the method of the invention, step c) comprises using modular manufacturing formworks or moulds for prefabricating the segments, such that one and the same formwork or mould allows manufacturing at least two different segments by adding or removing or modifying some portions of said formwork or mould.

In another preferred embodiment of the method of the invention, the segments are tubular, cylindrical, frustoconical, prismatic, truncated pyramid-shaped and/or have a polygonal section. This achieves the step of premanufacturing said segments being performed in a simplified manner compared to sections having a more complex geometry, without prejudice to the robustness of the shaft of a tower obtained with such sections.

In another preferred embodiment of the method of the invention, all the segments of one and the same tower are prefabricated during step c) with a height greater than 6.0 m. This achieves constructing very tall towers with a much lower number of segments and in a time-efficient manner with respect to the known alternatives in the prior art.

In another preferred embodiment of the invention, the segments with a larger diameter are manufactured in two C-shaped halves and joined together to form the segment of a tower on site.

A second object of the present invention relates to a tower manufactured and assembled by means of the method of the invention according to any of the embodiments thereof described herein. Preferably, said tower comprises a nacelle and/or one or more wind turbine blades.

In the scope of interpretation of the present invention, the term "substantially" will be understood to mean identical or comprised within a range of variation of ±10%.

In the scope of interpretation of the present invention, the term "definitive location" will be understood to mean the place where each tower is erected in its working or operating position on the wind farm. The definitive location, in turn, is formed by the position of the wind turbine and by its corresponding assembly platform.

In the scope of interpretation of the present invention, the term "position of the wind turbine" is the place where the tower and its foundation are located in their definitive position, the vertical axis of both substantially coinciding.

In the scope of interpretation of the present invention, the term "assembly platform" is interpreted to mean the area surrounding or immediately adjacent to the position of the wind turbine, where a crane which assembles the tower and the elements making up the tower is located.

In the scope of interpretation of the present invention, the term "wind farm" is interpreted to mean a region which accommodates the group of definitive locations and assembly platforms of the towers, as well as the transport land routes and one or more paths with external access to said farm. In a secondary manner, the term "wind farm" is considered applicable, without limitation, to any farm or region which accommodates a group of towers manufactured by means of the method of the invention, whether they are wind turbines or turbines of any other type.

In the scope of interpretation of the present invention, the term "segment of a tower" is interpreted to mean a section that can be pre-fabricated and is stackable in height, forming a shaft of a tower.

The segments preferably have an approximately cylindrical shape which shares a vertical axis substantially coinciding with the shaft of the tower, with its foundation and with the wind turbine positioning centre. The segments are preferably attached to one another by means of horizontal joints.

REFERENCE NUMBERS USED IN THE FIGURES

Figures 1, 2:
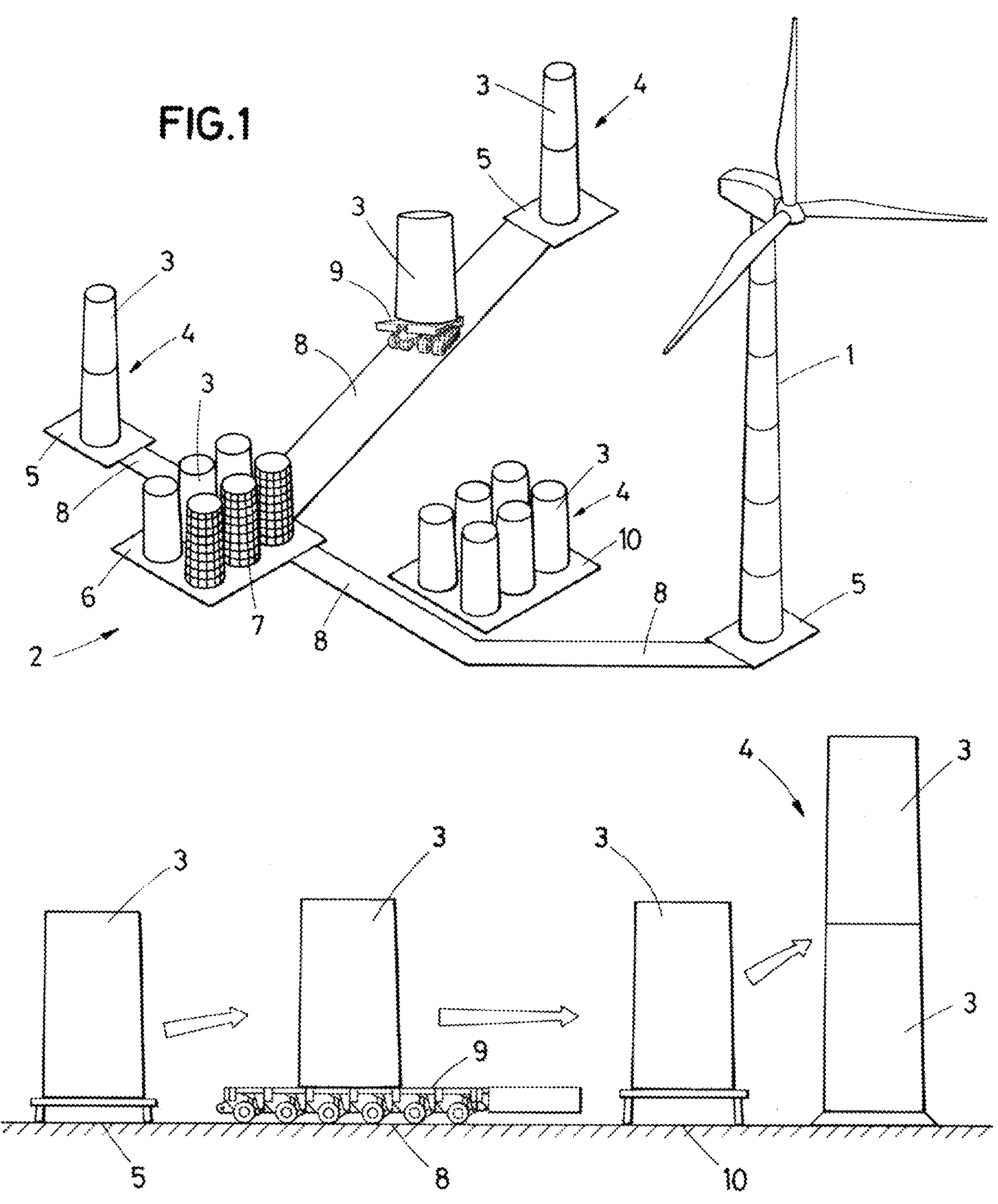
FIG. 1 shows a plan view of a wind farm configured for carrying out the method of the invention according to a preferred embodiment thereof.
FIG. 2 shows a schematic view of a step of transporting segments of a tower in the method of the invention according to a preferred embodiment thereof, where said very tall segments are in a substantially vertical position and are transported to the definitive location of the tower by means of a modular trailer-type transport system.

| | |
|---|---|
| (1) | Tower |
| (2) | Wind farm |
| (3) | Segments of a tower |
| (4) | Shaft of a tower |
| (5) | Definitive location of the tower |
| (6) | Centralised manufacturing point |
| (7) | Means for prefabricating segments of the towers |
| (8) | Land transport route |
| (9) | Land transport system |
| (10) | Stockpiling region |

DETAILED DESCRIPTION OF THE INVENTION

As described in the preceding sections, and as depicted in the preferred embodiments shown in FIGS. 1-2, a first object of the present invention relates to a method for manufacturing and assembling concrete towers (1), particularly indicated for the construction of towers (1) on wind farms (2) with multiple wind turbines, wherein said towers (1) are formed by a plurality of prefabricated segments (3). Said method is based on a synergistic combination of steps of manufacturing the segments (3), subsequent transport and assembly thereof as part of a shaft (4) of a tower (1), wherein said assembly is performed in the definitive location (5) of the tower (1), considerably reducing the number of segments (3) to be manufactured and a transport compared with the known methods, which results in a simplified manufacture and assembly.

As mentioned in the above sections, the method of the invention is based on two main premises:

i) The selection of a manufacturing location which allows routes from the factory to each assembly location which are free of vertical clearance obstacles, such as bridges, tunnels or electric lines. This will involve selecting locations for local manufacture, in the vicinity of the wind farm (2) (or, in general, of the definitive location (5) of the towers (1)) by means of a centralised manufacturing point (6), equipped with means (7) for prefabricating the segments (3) of the towers (1).

ii) The manufacture, storage, and transport of the very tall segments (3) of a tower (preferably, greater than 6 m) (1) in a substantially vertical position, through different land transport routes (8), as a result of the use of a land transport system (9) adapted for transporting segments (3) of this type in said substantially vertical position, said transport system (9) preferably being of the modular trailer, SPT and/or SPMT type.

These two characteristics allow a novel tower design and manufacturing, stockpiling, transport and assembly process significantly optimised for manufacturing prefabricated towers.

As shown in FIG. 1 herein, the method proposed by the invention relates to the manufacture and assembly of a plurality of towers (1) on a wind farm (2). Preferably, each of said towers (1) comprises a plurality of precast concrete segments (3) superimposed in height, forming a shaft (4) of a tower (1). Within the wind farm (2), each tower (1) occupies, after its assembly, a definitive location (5) corresponding to the operating or working location of the wind turbine.

More specifically, the method of the invention comprises performing the following steps a)-b), in an indifferent order:

a) Establishing a centralised manufacturing point (6) in which the routes to each location are free of vertical clearance obstacles on the wind farm or in its vicinity (2), wherein said centralised manufacturing point (6) is equipped with means (7) for prefabricating the segments (3) of the towers (1).

The location of the point of manufacture (6) on the wind farm (2) allows ensuring the absence of height and width restrictions characteristic of the general road network, by preferably being limited to travelling on the roads of the wind farm (2), which are narrower, flat and for the most part do not have cables, bridges and other obstacles limiting vertical and horizontal clearance to less than 5.0-6.0 m, as occurs on the road network. These characteristics of the roads occur on most wind farms (2), mainly due to the size and weight of the components of the turbine (formed by a nacelle and blades) and of the crane for the assembly of said turbine, which imposes the restrictions corresponding to the clearances and the road surface qualities of the farms.

In a preferred embodiment of the invention, at the manufacturing point (6), there are a number of vertical formworks, preferably on trestles acting as a lower formwork for each segment (3). Said formworks thus allow prefabricating the segments (3) of a tower (1) in a simple and scalable manner. In a preferred embodiment, there will be a first phase of premanufacture in which an inner mould is placed on each trestle, and then a volume of rebar is placed in the mould, to then close the mould with an outer formwork and pouring concrete for the part forming the segment (3). After curing of the part, the outer and inner moulds are removed, and the part is taken out to a stockpiling/placement area of the manufacturing point (6).

b) Establishing a plurality of land routes (8) from the centralised manufacturing point (6) to the definitive location (5) of the towers (1).

As described above, the land routes (8) correspond to the paths, roads or routes followed by the transport system (9) for transporting the segments (3), connecting the centralised manufacturing point (6) with the different definitive locations (5) of the towers (1) on the wind farm (2). Preferably, said land routes (8) do not pass under any bridge, tunnel and/or electrical power line. Likewise, the height of the segments (3) can be conditioned by hypothetical limitations of transport height, although a relevant limitation (for example, a high voltage line limiting the passage height to below 6.0 m) will, therefore, lead to the installation of the manufacturing point (6) in an area of the wind farm (2) on one side of said line first, and same will subsequently be taken to the other side of the line later if there is a sufficient number of wind turbine towers (1) on each side of same in order to offset the cost of taking same from the manufacturing point (6). Alternatively, the manufacturing point (6) can also be installed in the region of the wind farm (2) with the largest number of wind turbines, and it is possible to define two models of towers (1), one with fewer segments (3) but which are taller, and another one with more segments (3) but which are not as tall, such that they can be transported without any impediments to the other side of the wind farm (2).

Advantageously, the method of the invention further comprises performing the following steps c)-g):

c) Prefabricating in a substantially vertical position at least one segment (3) of a tower (1), the height of said segment (3) being greater than 6.0 m. The prefabricated segments (3) are preferably cylindrical (or approximately cylindrical or prismatic, even slightly frustoconical or truncated pyramid-shaped) elements making up the tower (1) or sections thereof, with the same simplicity of manufacture as that used in ring towers (1), but being significantly taller and also sometimes larger in diameter. Compared to the approximately 3-4 m tall rings of precast concrete towers (1) in the prior art, in a preferred embodiment, the segments (3) in the lower portion of the tower object of invention have a height greater than 6.0 m and the segments corresponding to the upper portion of the tower have a height up to 12.0 m. Therefore, the tower (1) will have a reduced number of segments (3) to be manufactured, transported, hoisted, placed and levelled, as well as a reduced number of horizontal joints to be formed, so the cost savings for each tower (1) are considerable. Furthermore, as for the diameter, preferably, segments (3) of a tower up to 6.0 m in diameter could be made, whereas conventional ring towers do not use annular parts with a diameter greater than 4.0 m by manufacturing, for larger widths, half-rings which are later attached to one another in the definitive location of the tower on the wind farm (2) to form a complete ring. This means that the method for manufacturing and assembling this tower will reduce the elements to be manufactured, transported and assembled to less than a third of those for current ring towers on the market.

In another preferred embodiment of the invention, the height of the different segments (3) will be adapted based on the target weight of each segment (3), so that one and the same crane configuration will allow the rapid assembly of all the segments (sections). This means that the lower segments (3) of the tower (1), which have a larger diameter, will be lower than the upper segments (3), having a smaller diameter and lower weight per linear metre of height.

d) Positioning the segment (3) prefabricated in step c) in a substantially vertical position on a land transport system (9).

In a preferred embodiment of the invention, the land transport system (9) comprises a modular trailer, an SPT and/or an SPMT. The SPMTs and the modular trailers are generally more expensive and usually slower (especially SPMTs) than the conventional trucks or smaller and simpler modular vehicles commonly used to transport prefabricated tower elements according to known methods. This theoretical drawback is by far offset by the lower number of segments (3) to be transported, as well as by the smaller distance between the manufacturing point (6) and the definitive locations (5) characteristic of the towers (1). The use of SPTs/SPMTs further allows guaranteeing the lateral stability in transporting such slender segments (3) in the vertical position, compared to transporting prefabricated segments (3) and voussoirs having similar heights from known methods, which are transported and stored in the horizontal position.

In another preferred embodiment of the invention, step c) and/or step d) are performed on raised supports, adapted such that they allow the land transport system (9) to be positioned under said raised supports, and wherein step d) is performed without using crane or overhead crane type lifting means. More preferably, the land transport system (9) and/or the raised support comprise height-adjustable surfaces, adapted such that they allow performing step d) by adjusting said surfaces until positioning the prefabricated segment (3) on said land transport system (9).

In that way, once each segment (3) is prefabricated in a substantially vertical position, it is taken out of its mould to a stockpiling area by means of introducing a transport system assembly (9) located below a raised point (for example, the trestle), and then the height of the transport system (9) is raised such that it raises the prefabricated segment (3) over the legs of the trestle and also takes it, in a substantially vertical position, to the definitive location (5) of the tower (1), where the segment (3) is again placed on trestles such that, with the reverse operation, free of cranes and of overturning operations, the entire logistic management of the segments (3) is done in a substantially vertical position, from the time they are manufactured until they are taken to the vicinity of the tower (1), where they will be incorporated in the shaft (4).

In another preferred embodiment of the invention, the time of use of each formwork can be reduced if a continuous and level standby position of the segment (3) is ensured, such that the final phase of curing the part forming the segment (3) does not produce unwanted deformations caused by leaving the part to rest, even if insufficiently cured, on isolated rather than continuous support elements. In this case, there may be a single crane movement which places the segment (3) on a level surface (for example, a polished concrete slab) to end up being cured, and after the necessary curing time elapses (for example, 72 hours), with that same crane, the segment (3) is again placed on a transport system (9) which takes it to the definitive location (5) of the tower. In this embodiment, there can also be supports for unloading the segments (3) without the need for cranes, but simply with the transport system (9) with which they have been transported.

e) Transporting the segment (3) positioned in step d), in a substantially vertical position on the land transport system (9), from the centralised manufacturing point (6) to a tower stockpiling region (10) or to the definitive location (5) of one of the towers (1), following one of the land routes (8).

Optionally, step e) may comprise a step of stockpiling or storing the segment (3) thus transported in the stockpiling region (10) or in the vicinity of the definitive location (5), in a substantially vertical position, up until the transport thereof to said definitive location (5) or up to the assembly thereof, as described in step f) below, respectively.

f) Assembling the segment (3) transported in step e) in the definitive location (5) of one of the towers (1), forming at least one portion of the shaft (4) of said tower (1).

g) Repeating steps c)-f) for a plurality of towers (1) on the wind farm (2).

In a preferred embodiment of the invention, steps c)-e) are performed on supports of about 1.5 m of free height. This, combined with the use of a transport system (9) of the modular trailer/SPT/SPMT type further allows the elimination or, to a great extent, the mitigation of the use of cranes, overhead cranes and other load lifting and moving means. Despite the fact that the elements to be manufactured (segments (3) of a tower (1)) are considerably larger and heavier than the characteristic elements of other prefabricated towers, the use of cranes for taking the parts out of the moulds or formworks in which they are manufactured, for taking them and unloading them for stockpiling or to the internal assembly positions, as well as for loading them for transport and unloading them in the definitive location (5) of the towers (1), is eliminated. In this way, by manufacturing and positioning the segments (3) on supports of, for example, a height of 1.5 m, the transport system (9) itself can be used for loading and unloading the segments (3). The use of small supports for stockpiling prefabricated elements is known in the sector, but supports designed for the loading and unloading thereof without a crane are not used.

Therefore, the method for manufacturing and assembling the invention can be used to construct a complete concrete tower (1) formed by segments (3) having a height greater than 6.0 m, or also to make a portion of a composite or hybrid tower (1), in which a section of the tower (1) is made with said method, and other portions are made with other materials, designs or processes. For example, the upper portion of a tower (1) can be formed by one or more conventional metallic sections, and the lower portion inferior can be made with the design and process herein described.

The invention claimed is:

1. A method for manufacturing and assembling a plurality of towers on a wind farm, wherein each of said towers comprises a plurality of precast concrete segments superimposed in height, forming a shaft of a tower, and wherein each tower occupies, after its assembly, a definitive location on the wind farm;

wherein the method comprises performing the following steps, in any order:

a) establishing a centralised manufacturing point, wherein said centralised manufacturing point is equipped with means for prefabricating the segments of the towers;

b) establishing a plurality of land routes from the centralised manufacturing point to the definitive location of the towers;

and wherein the method further comprises performing the following steps:

c) prefabricating in a substantially vertical position at least one segment of a tower, the height of said segment being greater than 6.0 m;

d) positioning the segment prefabricated in step c) in a substantially vertical position on a land transport system;

e) transporting the segment positioned in step d), in a substantially vertical position on the land transport system, from the centralised manufacturing point to the definitive location of one of the towers, following one of the land routes, wherein said land routes are entirely free of vertical clearance obstacles in the form of bridges or tunnels;

f) assembling the segment transported in step e) at the definitive location of one of the towers, forming at least one portion of the shaft of said tower;

g) repeating steps c)-f) for a plurality of towers on the wind farm.

2. The method according to claim 1, wherein step e) includes a step of stockpiling the segment in a region comprised between the manufacturing point and the definitive location of the tower, wherein the segment is stored said segment in the stockpiling region in a substantially vertical position until it is taken to the definitive location.

3. The method according to claim 1, wherein the land transport system comprises a modular trailer, an SPT and/or an SPMT.

4. The method according to claim 1, wherein step c) and/or step d) are performed on raised supports, adapted such that they allow the land transport system to be positioned under said raised supports, and wherein step d) is performed without using crane or overhead crane type lifting means.

5. The method according to claim 4, wherein the land transport system and/or the raised support comprise height-adjustable surfaces, adapted such that they allow performing step d) by adjusting said surfaces until positioning the prefabricated segment on said land transport system.

6. The method according to claim 1, wherein step f) further comprises, the stressing of the segment assembled in the shaft of the tower.

7. The method according to claim 1, wherein step f) further comprises making horizontal joints in one or more segments assembled in the shaft of the tower.

8. The method according to claim 1, wherein step c) comprises using modular manufacturing formworks or moulds for prefabricating the segments, such that said manufacturing formworks or moulds allow manufacturing at least two different segments by adding or removing or modifying at least one portion of said manufacturing formworks or moulds.

9. The method according to claim 1, wherein the segments are tubular, cylindrical, frustoconical, prismatic, truncated pyramid-shaped and/or have a polygonal section.

10. The method according to claim 1, wherein all the segments of at least one tower of the plurality of towers are prefabricated during step c) with a height greater than 5 m.

11. A tower assembled according to the method according to claim 1.

12. The tower according to claim 11, comprising a nacelle and/or one or more wind turbine blades.

* * * * *